Oct. 13, 1931.  A. J. DENNISS ET AL  1,827,464
PRESSURE PLATE OR PAD FOR PHOTOGRAPHIC CAMERAS
Filed Oct. 25, 1929  4 Sheets-Sheet 2

Inventors
Alfred J. Denniss
and Valentine W. Edwards
by Wilkinson & Giusta
Attorneys.

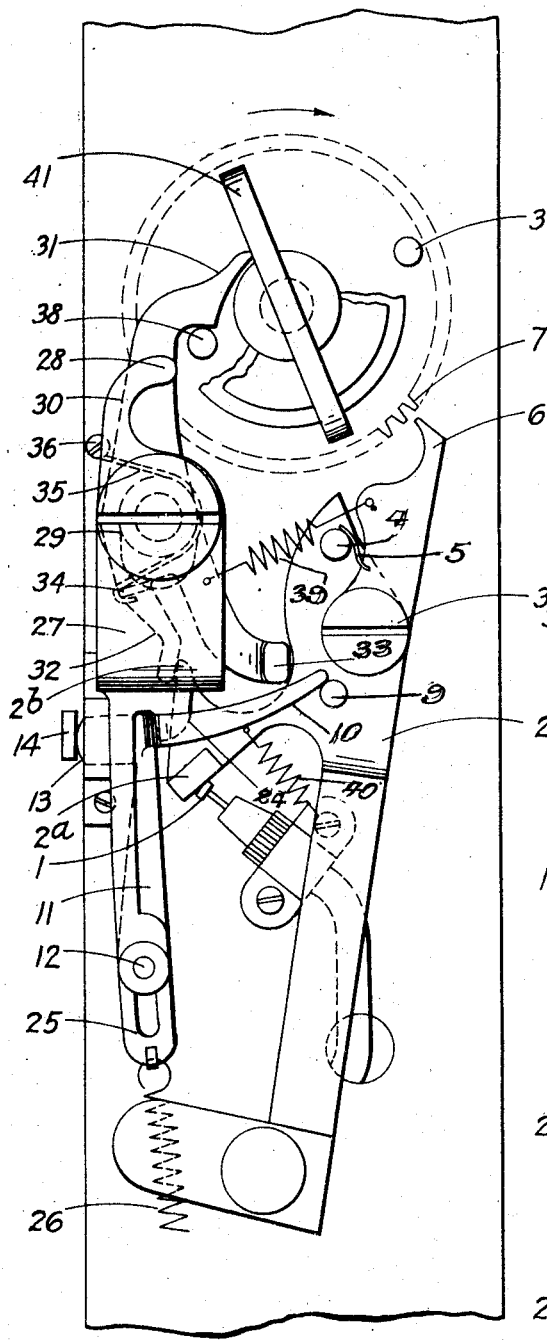
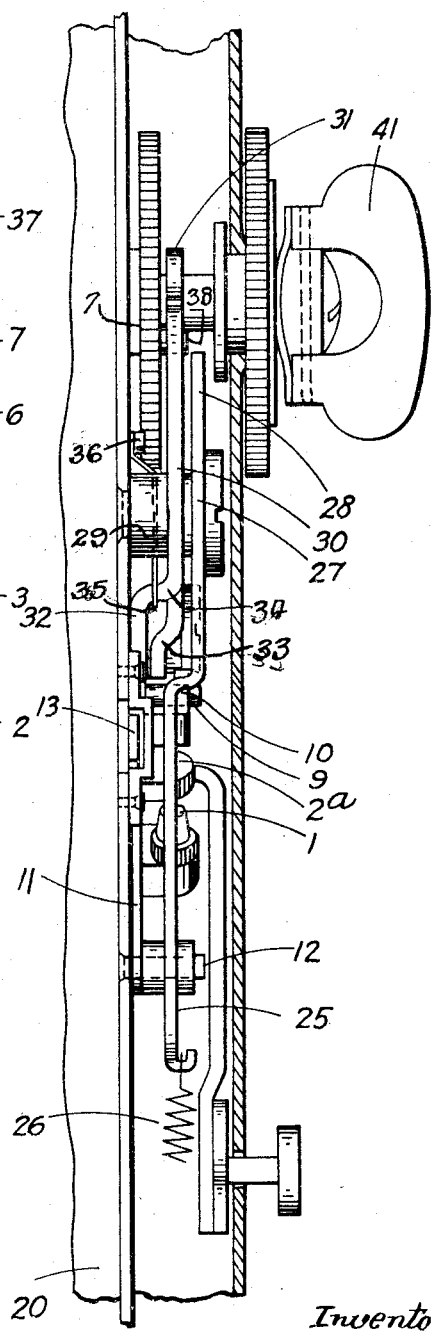

Oct. 13, 1931.  A. J. DENNISS ET AL  1,827,464
PRESSURE PLATE OR PAD FOR PHOTOGRAPHIC CAMERAS
Filed Oct. 25, 1929  4 Sheets-Sheet 4
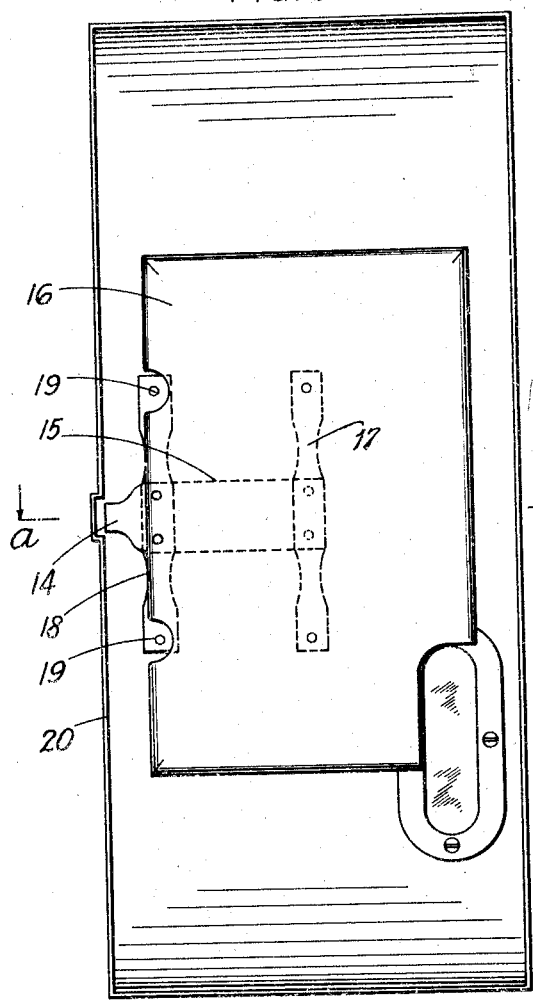
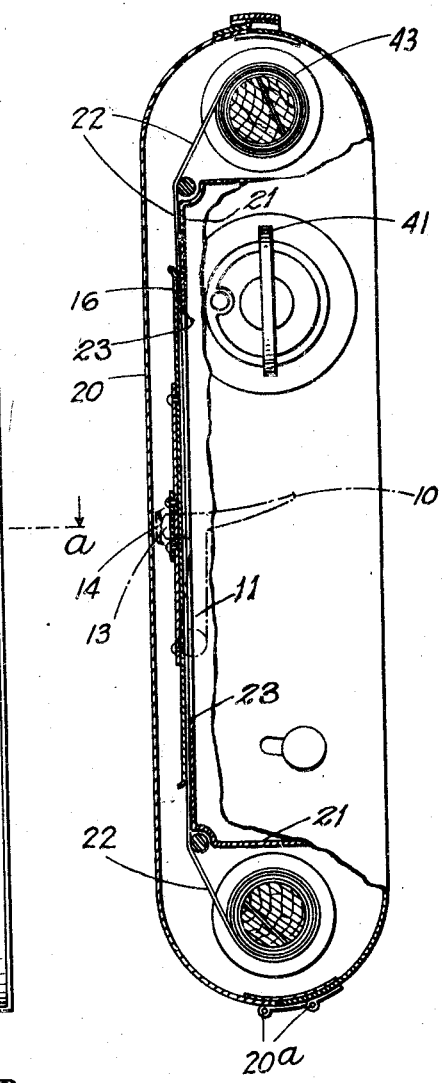
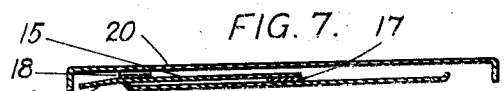
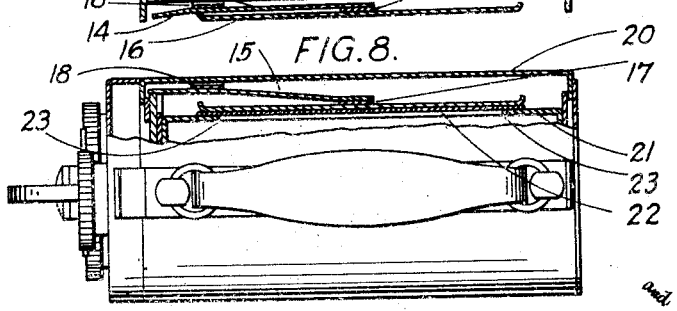
Inventors
Alfred J. Denniss
and Valentine W. Edwards
by Wilkinson & Giusta
Attorneys.

Patented Oct. 13, 1931

1,827,464

UNITED STATES PATENT OFFICE

ALFRED JOSEPH DENNISS, OF CHINGFORD, AND VALENTINE WILLIAM EDWARDS, OF WALTHAMSTOW, LONDON, ENGLAND, ASSIGNORS TO THE HOUGHTON-BUTCHER MANUFACTURING COMPANY LIMITED, OF LONDON, ENGLAND, AN ENGLISH LIMITED LIABILITY COMPANY

PRESSURE PLATE OR PAD FOR PHOTOGRAPHIC CAMERAS

Application filed October 25, 1929, Serial No. 402,490, and in Great Britain January 19, 1929.

This invention relates to releasable pressure plates or pads employed in photographic cameras to keep the portion of roll film which is in position for exposure pressed flat in the focal plane during such exposure, the pressure then being released to allow the film to be wound along to the next exposure position.

According to the present invention a pressure plate or pad normally held away from the film is moved into contact therewith by operation of the shutter-release and is returned to normal position when said shutter-release is freed.

Further according to this invention means are provided whereby on releasing the shutter for a "time" exposure, mechanism is automatically brought into action which holds the plate or pad pressed against the film while the shutter release is freed for the first part of the "time" exposure, said mechanism being rendered inoperative on completion of the "time" exposure and permitting the plate or pad to be withdrawn from the film.

In the preferred form of construction, the pressure plate or pad is mounted on an arm secured to or acted upon by a spring tending to keep the plate or pad in the "off" position. This arm is provided with an up-turned projection adapted to be engaged by a nose formed on an arm actuated by the shutter-release device in such a way that the first part of the movement of the shutter-release causes the projection on the arm carrying the pressure plate to be engaged and pressed towards the rear of the camera body, thereby pressing the other end of the arm and the pressure plate inwards or forwards into contact with the film.

When the shutter-release is freed to return to normal position, the spring secured to or forming part of the arm carrying the pressure plate moves the latter away from the film.

In order to keep the pressure plate pressed against the film during a "time" exposure in which the shutter-release is freed, and then operated a second time to complete the exposure, a spring-loaded slide is arranged to be brought into operation by the "time" exposure mechanism so that when the shutter-release is first actuated a nose is brought behind the arm actuating the pressure plate and retains the latter in contact with the film when the shutter-release is temporarily freed. This slide is normally held against the tension of its spring by a member connected to the shutter mechanism. For example in the case of a focal plane shutter, the slide may be normally engaged by a stud on the toothed wheel operating the shutter blind roller. When the shutter-release is actuated a second time to complete the exposure, the stud or other member connected to the shutter mechanism engages the slide, withdrawing the nose from behind the arm carrying the pressure plate and allows the latter to be retracted from the film by its spring.

We will now describe one constructional form of the invention with reference to the accompanying drawings:—

In these drawings:—

Figs. 2, 3 and 4 are side views of the mechanism effecting the winding and release of the focal plane shutter together with the mechanism for operating the releasable pressure plate the mechanism being shown in different stages of the operation as follows:—

Fig. 2 shows the position of the various parts when the shutter blind is partly wound up.

Fig. 3 shows the mechanism with the shutter blind fully wound up for a time exposure.

Fig. 4 shows the end of the first release for a time exposure.

Fig. 5 is a view of the parts shown in Figs. 2, 3 and 4 at right angles to the views in Figs. 2, 3 and 4.

Fig. 6 is a view of the inside of the rear cover carrying the pressure plate.

Fig. 7 is a view in section along the line A—A in Fig. 6 in the direction of the arrows.

Fig. 8 is a view partly in section of the camera in the same direction as Fig. 7 showing the position of the parts when the film is located for exposure.

Fig. 9 is a view partly in section in the same direction as Fig. 1 showing the pressure plate and its operating mechanism.

Figure 1:
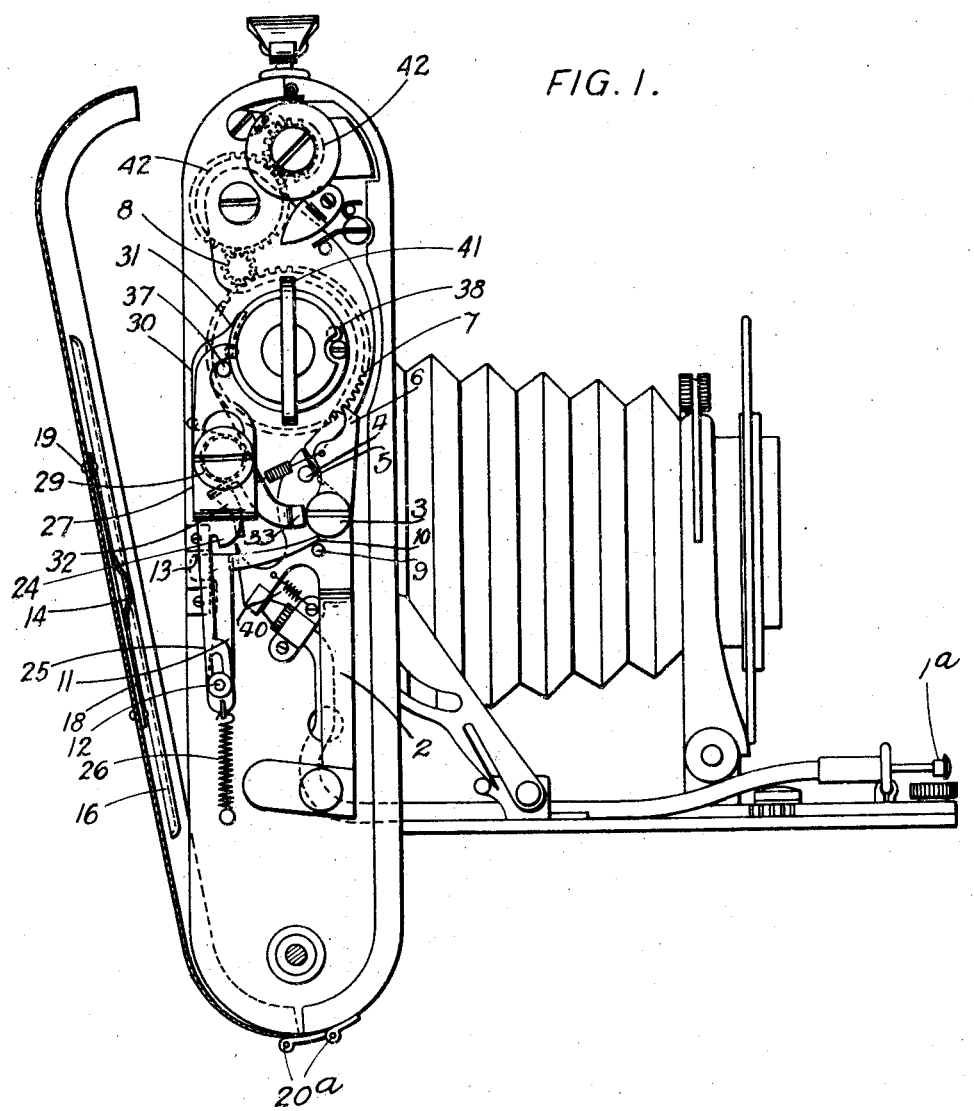
Fig. 1 is a side view partly in section of a camera of the focal plane shutter type embodying the present invention.

In Figs. 1 to 5; 1 is a shutter-release operated by a button 1ª, 2 is a lever pivoted at 3 to the body of the camera having a platform 2ª in contact with the shutter-release 1 and carrying a stud 4 which bears against a spring 5 inserted in a pawl 6 which engages with a toothed wheel 7 in mesh with a toothed wheel 8 (Fig. 1) carried by the shutter blind roller not shown.

The lever 2 carries a stud 9 which engages with a tail 10 of a lever 11 pivoted at 12 and having a nose 13 which engages with the shorter end 14 of a spring arm 15 which is attached to a transverse spring 18 (see Figs. 6, 7 and 8). The spring 18 is riveted at 19 (Figs. 1 and 6) to the outer cover 20 which is hinged to the body of the camera at 20ª Figs. 1 and 9. The longer end of the spring arm 15 carries a transverse spring 17 which is fixed at its outer ends to the pressure plate 16. The film 22 lies between the pressure plate 16 and the inner casing 21 which has an aperture corresponding to the area of film to be exposed and the pressure plate 16 overlaps the edges of this aperture which are shown at 23 in Figs. 8 and 9.

Referring again to Figs. 1 to 5, 25 is a slotted slide on the pivot 12 which lies within the slot. This slide has a catch 24 engaging with a joggle in the lever 11 and attached at its lower end to the casing of the camera by the tension spring 26. The slide 25 is prolonged by a further slotted bar 27 whose slot slides upon a pin 29. The bar 27 carries at its upper end a projection 28 adapted to be engaged by a stud 37 carried by the toothed wheel 7. Pivoted about the pin 29 is a curved lever 30 adapted to be engaged by a stud 38 also carried by the toothed wheel 7. At its upper end the lever 30 is formed into a cam 31 and at its lower end is formed into two arms 32 and 33 the arm 32 adapted to be engaged by a tongue on the lever 2 and having a joggle 34 engaging a spring 35 which is passed around the pin 29 and attached by a set screw 36 to the body of the camera. A tension spring 39 connects the arm 33 of the lever 30 and the pawl 6.

41 is a butterfly for winding up the roller blind and film, rigidly connected with the toothed wheel 7 and operatively connected to the film carrying roller 43 (Fig. 9) by the train of gear wheels 8, 42 (Fig. 1).

The operation of the mechanism is as follows:—

Figure 2:
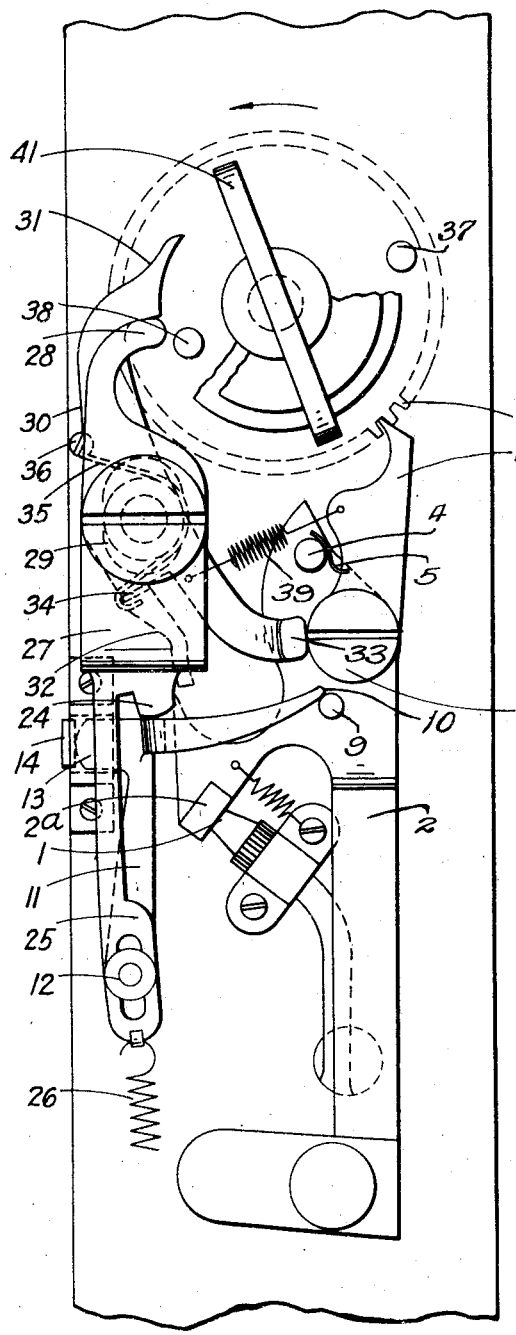

Referring to Figs. 1 to 5—starting from the unwound position the operator turns the butterfly 41 in the direction of the arrow in Fig. 2. This turns the shutter blind roller in the opposite direction by means of the toothed wheel 8 (Fig. 1) and winds up the shutter blind; at the same time by means of the train of gears 42 and the film-carrying roller 43 (Fig. 9) winding an unexposed portion of film into place opposite the aperture 23 of the inner casing 21 (see Figs. 8 and 9). The pawl 6 is so shaped that when the toothed wheel 7 is rotated in the direction of the arrow (Fig. 2) the pawl 6 jumps the teeth of the wheel 7 and permits rotation. When the wheel 7 has been turned so far that the stud 37 has reached the dotted position shown by the reference 37ª in Fig. 3 the shutter blind is fully wound for an instantaneous exposure and the film is in position for exposure.

On pressing the button 1ª (Fig. 1) the shutter release 1 presses against the platform 2ª of the lever 2, which rocks about the pivot 3 and acting by means of the stud 4 and spring 5 disengages the pawl 6 from the toothed wheel 7 thus allowing the shutter blind to travel across the plate being unwound by the force of its proper spring (not shown).

The rocking of the lever 2 as described above at the same time acts by means of the stud 9 on the tail 10 of the lever 11 and presses the nose 13 of the lever 11 against the short end 14 of the spring arm 15 (see also Fig. 9) the long arm of which (Figs. 6, 7, 8) acting through the spring 17 forces the pressure plate 16 towards the inner casing 21 thus gripping the film 22 between the casing 21 and the pressure plate 16. When the lever 11 is pressed forward by the action of the stud 9 on the tail 10, the catch 24 of the slotted bar 25 is drawn down by the tension of the spring 26 behind the joggle in the lever 11 (see Fig. 4), thus locking the pressure plate in position. When the shutter blind unwinds to make the exposure the toothed wheel 7 is rotated in the reverse direction and near the completion of this movement the stud 37 engages with the underside of the projection 28 of the slide 27, 25, and draws it up thus releasing the catch 24 and allowing the pressure plate to be returned to its normal position clear of the film by the action of the spring 18 which is distorted when the pressure plate is gripping the film.

Figure 3:
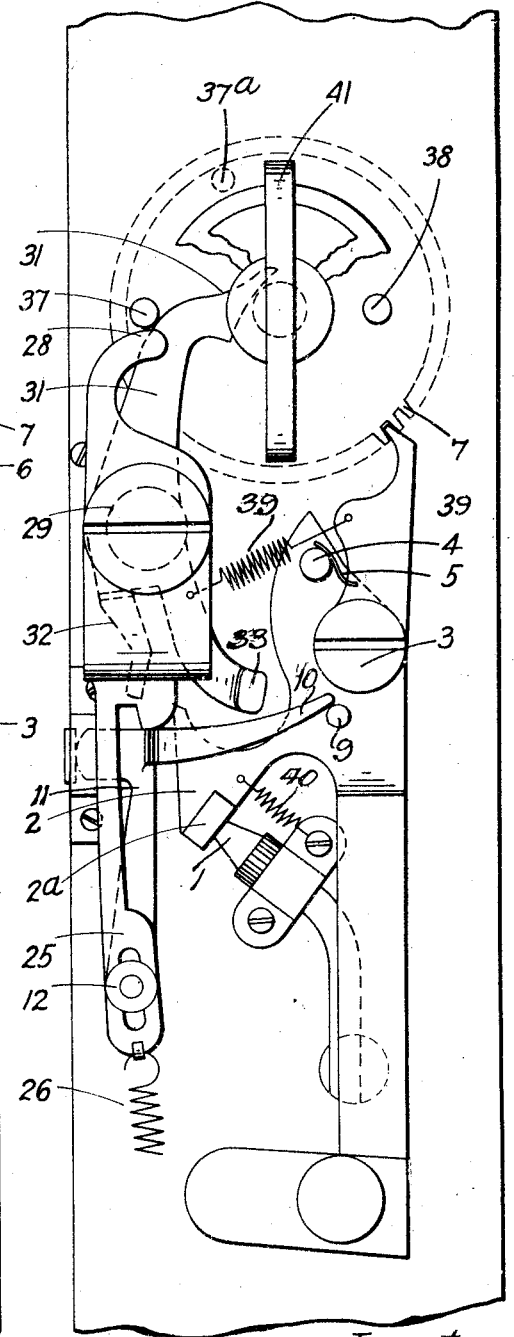

If it is desired to make a "time" exposure the butterfly 41 is wound in the direction of the arrow until the position shown in Fig. 3 is reached. In this position the further winding of the butterfly 41 and toothed wheel 7 has brought the stud 37 into contact with the cam 31 on the curved lever 30 thus rocking this lever about its pivot pin 29 in a direction bringing the upper end of the lever 30 towards the centre of the wheel 7.

The first release is made exactly as in the case of an instantaneous exposure, but when the shutter blind has travelled far enough completely to expose the film the stud 38 engages the underside of the curved lever 30 and arrests further movement of the shutter (see Fig. 4). At the same time a projection 2ᵇ (Fig. 4) on the lever 2 engages behind the arm 32 of the lever 30 (see Fig. 4) thus locking the latter, while the shutter blind is unwinding. On releasing the button 1ᵃ the disengaging pressure exerted by the stud 4 and spring 5 on the pawl 6 is released and the pawl 6 is engaged with the toothed wheel 7 by the spring 39 thus continuing the exposure the arm 32 being so proportioned that it is not released by the projection 2ᵇ on the lever 2 until the pawl 6 is engaged; the pressure plate 16 being meanwhile held down on the film by the engagement of the catch 24. When the button 1ᵃ is again pressed the shutter-release 1 presses on the platform 2ᵃ of the lever 2 and acting as before again releases the pawl 6. During the exposure period the spring 35 acting on the joggle 34 of the arm 32 of the curved lever 30 has carried the upper part of lever 30 clear of the stud 38 so that on release of the pawl 6 the toothed wheel 7 and shutter blind roller 8 are enabled to complete the exposure, the catch 24 being withdrawn by the stud 37 as before. In either species of exposure at each release of the button 1ᵃ the lever 2 is returned to its initial position by the spring 40.

The arm 33 of the lever 30 by coming in contact with the head of the pivot 3 acts as a stop to prevent the lever 30 being drawn back too far by the spring 35.

Although in order to render clear the construction and operation of the pressure plate, it has been described in conjunction with a special form of film-winding and shutter-setting mechanism it will be apparent that said pressure plate and its operating mechanism may readily be employed in various other forms of camera mechanism.

What we claim is:—

1. In a roll film photographic camera including a shutter-release, means for locating flat in the focal plane that portion of film which is in position for exposure comprising a plate mounted behind the film, spring means normally holding said plate away from the film, and means in operative connection with said shutter-release for moving said plate into contact with the film to press the same flat in the focal plane when the shutter-release is actuated, the plate being returned to normal position by the spring means when said shutter-release is freed.

2. In a roll film photographic camera including a shutter-release means for locating flat in the focal plane that portion of film which is in position for exposure comprising a plate mounted behind the film, spring means normally holding said plate away from the film, mechanism in operative connection with the said shutter-release for moving the plate into contact with the film when said shutter-release is actuated, means adapted to engage a part of the said mechanism in such a manner as to hold the said plate against the film when the shutter-release is freed at the end of the first part of a "time" exposure, and means for effecting disengagement when the exposure has been completed to allow the plate to be returned to normal position away from the film.

3. In a roll film photographic camera including a back member and a shutter release, means for locating flat in the focal plane that portion of the film which is in position for exposure comprising a spring secured to the said back member, a plate normally held clear of the film, a plate carrying arm including a projecting end, an arm adapted to be moved by the shutter release to engage the said projecting end of the plate carrying arm and to move the plate into contact with the film and hold same flat in the focal plane and spring means for returning the parts to normal position on freeing the shutter release.

4. In a roll film camera including shutter-winding mechanism film locating means in accordance with claim 3 embodying a slide having a catch located for engagement with the arm which is actuated by the shutter-release, spring means tending to effect such engagement, means in operative connection with the shutter-winding mechanism to prevent such engagement when the shutter-winding mechanism is in normal unwound position, the arrangement being such that on winding the shutter to "set" position for a "time" exposure and releasing the shutter the catch on the slide is moved by its spring into engagement with the arm actuating the pressure plate so as to prevent the latter being moved away from the film at the end of the first part of the "time" exposure when the shutter release is freed, while when the latter is again operated the catch is disengaged from the arm by means in operative connection with the shutter-winding mechanism, and allows the pressure plate to return to normal position away from the film.

ALFRED JOSEPH DENNISS.
VALENTINE WILLIAM EDWARDS.